United States Patent
Chen et al.

(10) Patent No.: US 8,629,947 B2
(45) Date of Patent: Jan. 14, 2014

(54) LIQUID CRYSTAL PANEL

(75) Inventors: Yu-Ting Chen, Chiayi (TW); Hung-Jen Wang, Taipei County (TW); Hsiu-Lin Chan, Hsinchu County (TW)

(73) Assignee: Wintek Corporation, Taichung (TW)

( * ) Notice: Subject to any disclaimer, the term of this patent is extended or adjusted under 35 U.S.C. 154(b) by 1211 days.

(21) Appl. No.: 12/506,331

(22) Filed: Jul. 21, 2009

(65) Prior Publication Data

US 2010/0020255 A1 Jan. 28, 2010

(30) Foreign Application Priority Data

Jul. 24, 2008 (TW) .............................. 97127821 A

(51) Int. Cl.
*G02F 1/1343* (2006.01)
(52) U.S. Cl.
USPC ............................................ 349/38; 349/139
(58) Field of Classification Search
USPC ...................................... 349/38, 39
See application file for complete search history.

(56) References Cited

U.S. PATENT DOCUMENTS

| 6,757,045 | B1 * | 6/2004 | Asao et al. ..................... 349/172 |
| 7,046,315 | B2 * | 5/2006 | Kim et al. ......................... 349/44 |
| 7,142,260 | B2 * | 11/2006 | Yang ................................ 349/38 |
| 2002/0180897 | A1 * | 12/2002 | Chae ................................ 349/39 |
| 2003/0136971 | A1 * | 7/2003 | Rhee et al. ...................... 257/98 |
| 2004/0080679 | A1 * | 4/2004 | Song et al. ....................... 349/43 |
| 2007/0273800 | A1 | 11/2007 | Nomura et al. |
| 2009/0141203 | A1 * | 6/2009 | Son et al. ......................... 349/39 |

FOREIGN PATENT DOCUMENTS

| CN | 1482504 | 3/2004 |
| CN | 101106142 | 1/2008 |
| TW | 200809365 A | 2/2008 |

OTHER PUBLICATIONS

English language translation of abstract of CN 1482504 (published Mar. 17, 2004).
English language translation of abstract of CN 101106142 (published Jan. 16, 2008).
English Abstract translation of TW200809365 (Published Feb. 16, 2008).
TW Office Action dated Nov. 27, 2012.

* cited by examiner

*Primary Examiner* — Edward Glick
*Assistant Examiner* — Dennis Y Kim
(74) *Attorney, Agent, or Firm* — McClure, Qualey & Rodack, LLP

(57) ABSTRACT

A liquid crystal panel including a bottom substrate, a top substrate and a liquid crystal layer is provided. The bottom substrate includes a base plate, an active array structure layer, a color filter layer with plural colors and plural transparent pixel electrodes. The active array structure layer includes plural transparent bottom electrodes and plural transistor structures, at least one insulation layer, plural scan lines and plural data lines both formed on the base plate. At least one insulation layer covers the transparent bottom electrodes. The color filter layer is formed on the active array structure layer. The transparent pixel electrodes are formed on the color filter layer. Each transparent pixel electrode partially overlaps the corresponding transparent bottom electrodes so as to form plural storage capacitor structures. The top substrate is substantially parallel to the bottom substrate. The liquid crystal layer is located between the top substrate and the bottom substrate.

7 Claims, 3 Drawing Sheets

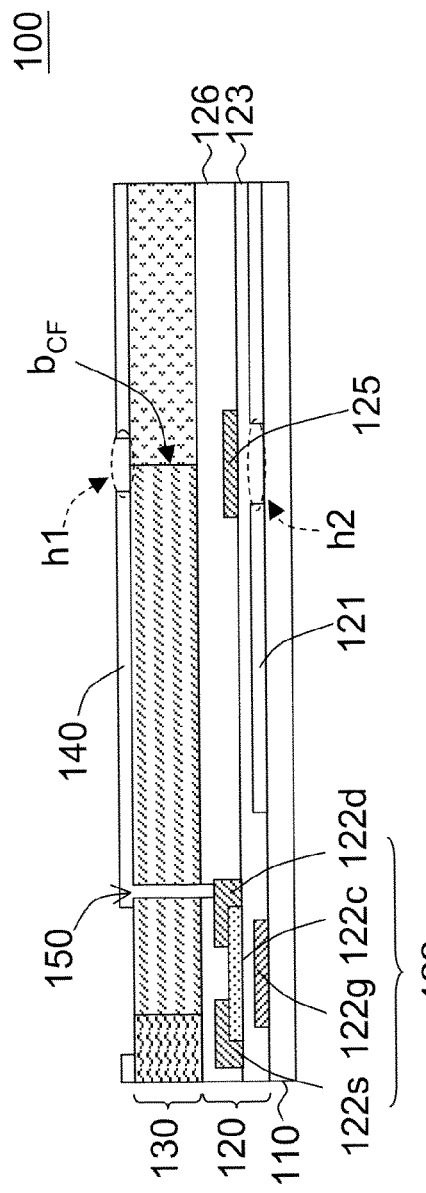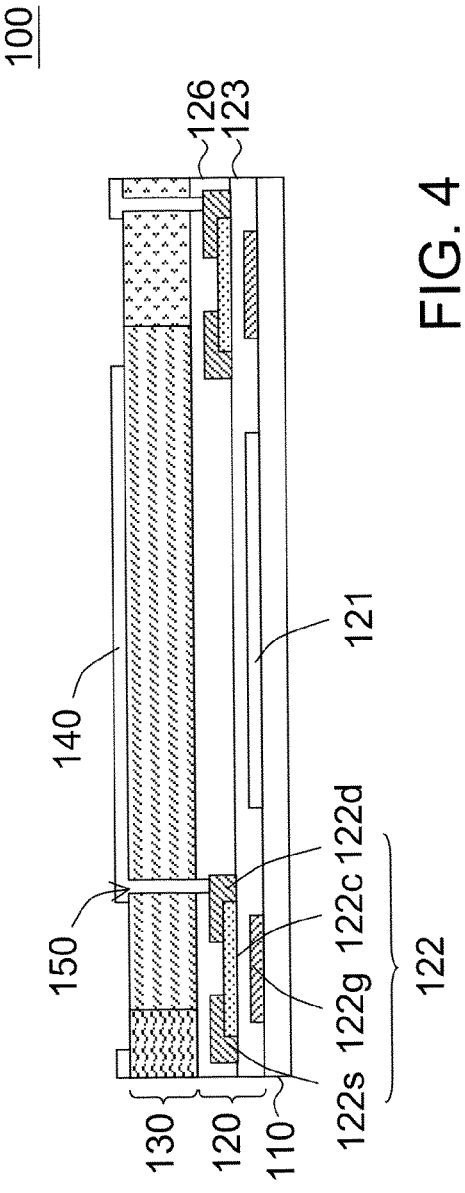

LIQUID CRYSTAL PANEL

This application claims the benefit of Taiwan application Serial No. 97127821, filed Jul. 24, 2008, the subject matter of which is incorporated herein by reference.

BACKGROUND OF THE INVENTION

1. Field of the Invention

The invention relates in general to a liquid crystal panel, and more particularly to a liquid crystal panel with high aperture ratio.

2. Description of the Related Art

Along with the booming in the industry of liquid crystal panel in recent years, the advance in manufacturing process and the increase in market demand, the manufacturers must keep improving the display quality of the panel so as to meet the consumers' higher and higher standard of display quality when expanding their manufacturing capacity.

In terms of the thin-film transistor color filter on array (COA) technology, its storage capacitor structure is normally constituted by the first metal layer being stacked on the second metal layer, and is called the metal insulator metal (MIM) storage capacitor. However, the MIM storage capacitor is not transmitting, the aperture ratio of the pixel is restricted thereby. Especially in the application of high-resolution liquid crystal panel, the MIM storage capacitor occupies an area at the expense of the aperture ratio of the pixel, further deteriorating display quality. Thus, how to increase the aperture ratio so that the high-resolution liquid crystal panel can improve its market competitiveness has become an imminent issue to the industry.

SUMMARY OF THE INVENTION

The invention is directed to a liquid crystal panel, which integrates a color filter and a thin-film transistor array on the same substrate, and further constitutes a transmitting storage capacitor structure by large-sized and transmitting transparent bottom electrodes and the transparent pixel electrodes, so that the aperture ratio of the pixel is not subjected to the storage capacitor structure and has the advantage of a higher aperture ratio.

According to a first aspect of the present invention, a liquid crystal panel including a bottom substrate, a top substrate and a liquid crystal layer is provided. The bottom substrate includes a base plate, an active array structure layer, a color filter layer with a plurality of colors, and a plurality of transparent pixel electrodes. The active array structure layer includes a plurality of transparent bottom electrodes and a plurality of transistor structures, at least one insulation layer, a plurality of scan lines and a plurality of data lines both formed on the base plate. At least one insulation layer covers the transparent bottom electrodes. The color filter layer is formed on the active array structure layer. The transparent pixel electrodes are formed on the color filter layer. Each of the transparent pixel electrodes partially overlaps the corresponding transparent bottom electrodes so as to form a plurality of storage capacitor structures. The top substrate is substantially disposed in parallel with the bottom substrate. The liquid crystal layer is located between the top substrate and the bottom substrate.

The invention will become apparent from the following detailed description of the preferred but non-limiting embodiments. The following description is made with reference to the accompanying drawings.

BRIEF DESCRIPTION OF THE DRAWINGS

FIG. 3 shows a cross-sectional view of the bottom substrate corresponding to a cross-sectional line 3-3' of FIG. 2; and FIG. 4 shows a cross-sectional view of the bottom substrate corresponding to a cross-sectional line 4-4' of FIG. 2.

DETAILED DESCRIPTION OF THE INVENTION

The invention provides a liquid crystal panel, which integrates a color filter and a thin-film transistor array on the same substrate and further constitutes a transmitting storage capacitor structure by large-sized and transmitting transparent bottom electrodes and the transparent pixel electrodes. Compared with the liquid crystal panel manufactured by a generally known technology, the liquid crystal panel of the invention has the advantage of a higher aperture ratio.

Generally speaking, the aperture ratio has much to do with the controllable area of the liquid crystal molecules. However, the aperture ratio of a general panel (not the COA panel) is even more subjected to the influence of the layout of storage capacitor structures and the precision in assembling a black matrix. In terms of a COA panel, despite the aperture ratio is not subjected to the influence of the precision in assembling the black matrix, the aperture ratio of the COA panel is still subjected to the layout of storage capacitor structures.

In the embodiments of the invention, the COA panel and the transmitting storage capacitor structures are used, therefore the aperture ratio is not subjected to the storage capacitor structures and the precision in assembling the black matrix. Compared with the panel manufactured by generally known technology, the panel of the invention provides a superior aperture ratio especially in the application of high-resolution liquid crystal panel.

Figure 1:
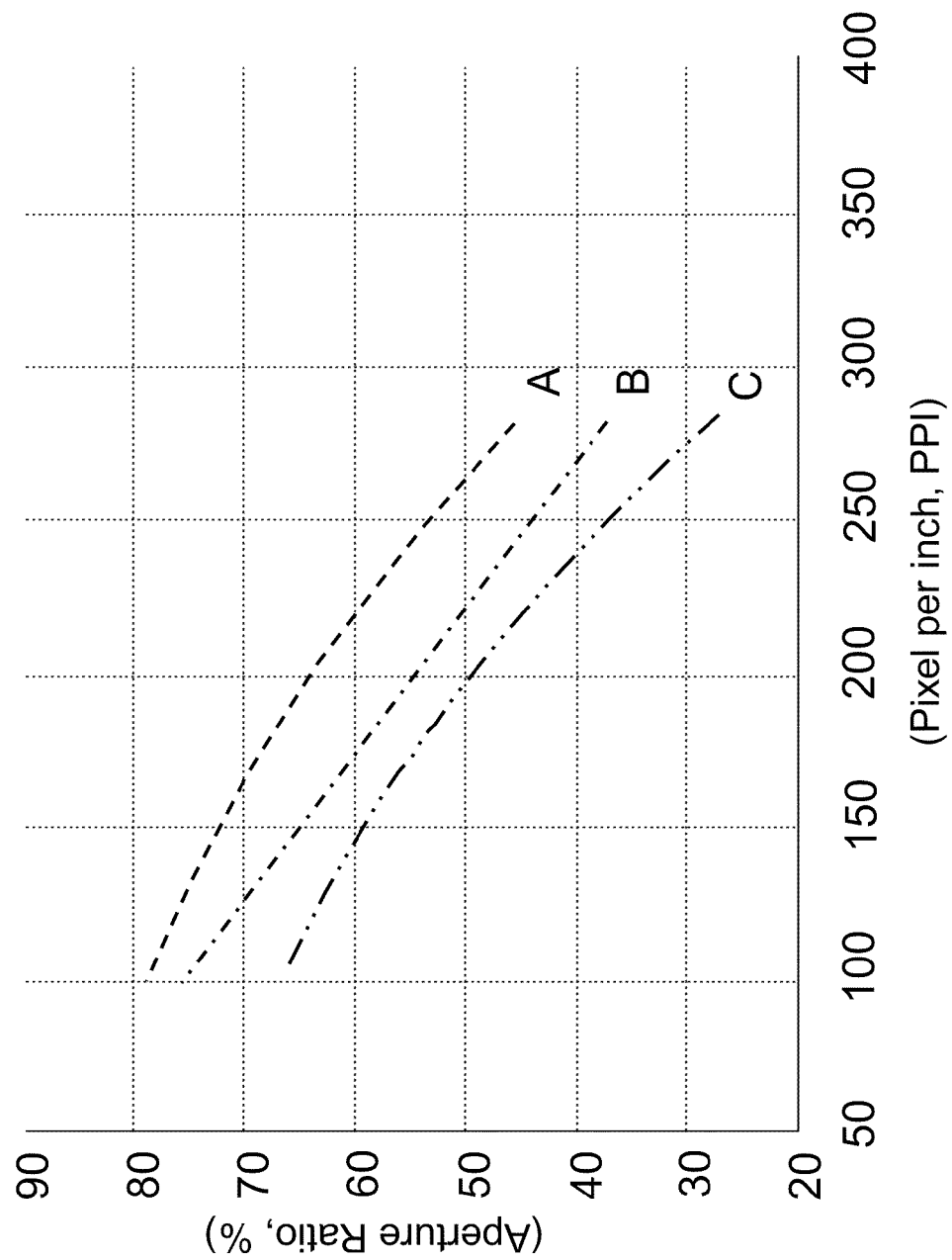
FIG. 1 shows a relationship between the resolution and the aperture ratio of a liquid crystal panel.

For example, let a 4.3" (WVGA) panel whose resolution is 220 PPI be taken for comparison. The aperture ratio of the liquid crystal panel of an embodiment of the invention is about 58.1%. The aperture ratio of the panel manufactured by general COA technology is about 48.2%, and the aperture ratio of the panel not manufactured by COA technology is about is only about 40.3%. Referring to FIG. 1, a relationship between the resolution and the aperture ratio of a liquid crystal panel is shown. Provided that resolution is high, the liquid crystal panel of the embodiment of the invention has the advantage of higher aperture ratio. In the accompanied diagrams, the curve A refers to the liquid crystal panel of the embodiment of the invention, the curve B refers to the liquid crystal panel manufactured by general COA technology, the curve C refers to the liquid crystal panel not manufactured by COA technology.

In a further embodiment of the invention, the color filter layer is disposed between the active array structure layer and the transparent pixel electrodes so as to form electrical field shielding effect. As a consequence, the disordered arrangement of liquid crystal molecules in the corresponding part (the pixel boundary area) is effectively reduced, the controllable area of the liquid crystal molecules is increased, a superior aperture ratio is provided, and light leakage is avoided. The disordered arrangement of liquid crystal molecules is caused by the effect of electrical field between the pixel electrode and the data lines.

A preferred embodiment and accompanied drawings are provided below for elaborating the structure of a liquid crystal panel as a reference for anyone who is skilled in the above technology and would like to put it into implementation. However, anyone who is skilled in the technology of the invention will understand that the liquid crystal panel has many forms of structural and layout, and the structural diagrams are for elaboration only, not for limiting the scope of protection of the invention. Furthermore, secondary elements are omitted in the diagrams to highlight the technical characteristics of the technology of the invention.

The liquid crystal panel of the preferred embodiment of the invention includes a bottom substrate, a top substrate and a liquid crystal layer. The top substrate is substantially disposed in parallel with the bottom substrate. The liquid crystal layer is located between the top substrate and the bottom substrate. In the present embodiment of the invention, the bottom substrate is a thin-film transistor color filter on array (COA) substrate.

Figure 2:
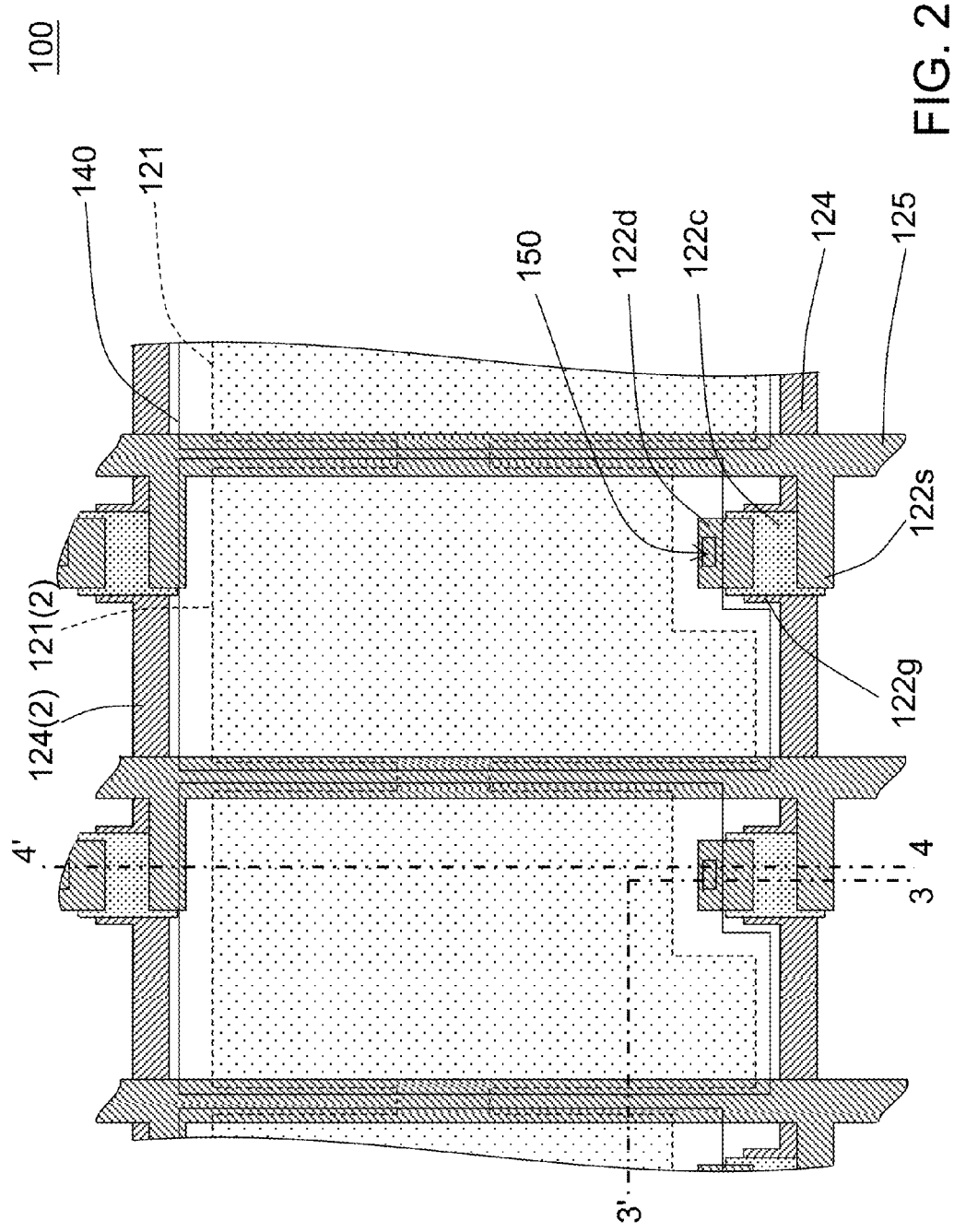
FIG. 2 shows a bottom substrate of a liquid crystal panel according to a preferred embodiment of the invention.

Referring to FIG. 2, a bottom substrate of a liquid crystal panel according to a preferred embodiment of the invention is shown. Also referring to FIG. 3 and FIG. 4. FIG. 3 shows a cross-sectional view of the bottom substrate corresponding to a cross-sectional line 3-3' of FIG. 2. FIG. 4 shows a cross-sectional view of the bottom substrate corresponding to a cross-sectional line 4-4' of FIG. 2. The bottom substrate 100 includes a base plate 110, an active array structure layer 120, a color filter layer with a plurality of colors 130, and a plurality of transparent pixel electrodes 140.

The active array structure layer 120 includes a plurality of transparent bottom electrodes 121, a plurality of transistor structures 122, an insulation layer 123, a plurality of scan lines 124, a plurality of data lines 125 and a passivation layer 126. The transistor structures 122 include a gate 122g, a source 122s, a drain 122d and a channel layer 122c. The gate 122g and the scan lines 124 are located on the same metal layer. The source 122s and the data lines 125 are located on the same metal layer. The insulation layer 123 covers transparent bottom electrodes 121.

The color filter layer 130 is formed on the active array structure layer 120. The transparent pixel electrodes 140 are formed on the color filter layer 130. Each of the transparent pixel electrodes 140 partially overlaps the corresponding transparent bottom electrodes 121 so as to form a plurality of large-sized and transmitting storage capacitor structures.

The data lines 125 and the scan lines 124 define a plurality of pixels each including a transistor structure 122, a transparent bottom electrode 121, an insulation layer 123, a passivation layer 126, a color filter layer with a plurality of colors 130, and a transparent pixel electrode 140. The scan lines 124 respectively are electrically connected to gates 122g of the transistor structures 122. The data lines 125 respectively are electrically connected to sources 122s of the transistor structures 122. The scan lines 124 are insulated from the data lines 125 by the insulation layer 123. The transparent pixel electrodes 140 respectively are electrically connected to a drain 122d of the transistor structures 122 through the contact hole 150.

As the storage capacitor structure of the present embodiment of the invention is exemplified by the structure of Cs on Common, the transparent bottom electrodes respectively are electrically connected to a common electrode voltage. However, the storage capacitor structure of the invention is not limited to the structure of Cs on common. In the technology of liquid crystal panel, the storage capacitor structure can also be implemented by the structure of Cs on Gate. For example, when the storage capacitor structure of an embodiment of the invention is implemented by the structure of Cs on Gate, the transparent bottom electrode of each pixel can be electrically connected to the gate of the transistor structure of another pixel. For example, the transparent bottom electrode 121 (2) of FIG. 2 is electrically connected to the gate 122g.

Preferably but not restrictively, the data lines 125 partly overlap the transparent bottom electrodes 121 and the transparent pixel electrodes 140, a first opening h1 is located between two adjacent transparent pixel electrodes 140, the first opening h1 is located above the corresponding data lines 125, the first opening h1 is extended along the corresponding data lines 125, and each of the data lines 125 partially overlaps two corresponding adjacent transparent pixel electrodes 140.

A second opening h2 is located between two adjacent transparent bottom electrodes 121. The second opening h2 is located under the corresponding data lines 125. The second opening h2 is extended along the corresponding data lines 125. The data line 125 disposed above the second opening h2 partially overlaps two corresponding adjacent transparent bottom electrodes 121.

Besides, the color of the color filter layer 130 disposed under the transparent pixel electrodes 140 differs with the color of the color filter layer 130 disposed under the other adjacent transparent pixel electrodes 140, and a boundary $b_{CF}$ between two adjacent color filter layers with different colors 130 is located above the corresponding data lines 125.

Compared with the liquid crystal panel not manufactured by COA technology, the color filter layer 130 of the present embodiment of the invention is disposed between the active array structure layer 120 and the transparent pixel electrodes 140, so the distance between the transparent pixel electrodes 140 and the data lines 125 is increased, the effect of the electrical field between the transparent pixel electrodes 140 and the data lines 125 is reduced, and the distance between two adjacent transparent pixel electrodes 140 is also reduced (by reducing the size of the first opening h1). Thus, the controllable area of the liquid crystal molecules is increased, and the area of the liquid crystal molecules being affected by electrical field and resulting in disordered arrangement is reduced.

Compared with the liquid crystal panel with MIM storage capacitors, the panel of the present embodiment of the invention constitutes a storage capacitor by the transparent bottom electrodes 121 and the transparent pixel electrodes 140, is free of a non-transmitting MIM storage capacitor which blocks the light, and achieves a higher aperture ratio.

As each of the data lines 125 partly overlaps the transparent bottom electrodes 121 and the transparent pixel electrodes 140 and is opposite to the first opening h1, the present embodiment of the invention blocks the light corresponding to the area of the opening h1 by the data lines 125 without employing any extra black matrix. Thus, the present embodiment of the invention has a superior aperture ratio and effectively avoids light leakage.

As the present embodiment of the invention does not employ the black matrix, the drop in the aperture ratio caused by assembling error during the assembly of the top substrate and the bottom substrate is avoided.

The liquid crystal panel disclosed in the above embodiments of the invention integrates a color filter and a thin-film transistor array on the same substrate, and further constitutes a transmitting storage capacitor structure by large-sized and transmitting transparent bottom electrodes and the transparent pixel electrodes, so that the aperture ratio of the pixel is not subjected to the storage capacitor structures and has the advantage of a higher aperture ratio.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal panel, comprising:
a top substrate;
a liquid crystal layer; and
a bottom substrate substantially disposed in parallel with the top substrate, wherein the liquid crystal layer is located between the top substrate and the bottom substrate, and the bottom substrate comprises:
a base plate;
an active array structure layer comprising a plurality of transparent bottom electrodes formed on the base plate, a plurality of transistor structures, at least one insulation layer, a plurality of scan lines and a plurality of data lines both formed on the base plate, wherein the at least one insulation layer covers the transparent bottom electrodes;
a color filter layer with a plurality of colors formed on the active array structure layer; and
a plurality of transparent pixel electrodes formed on the color filter layer with the plurality of colors, wherein each of the transparent pixel electrodes partially overlaps a corresponding one of the transparent bottom electrodes so as to form a plurality of storage capacitor structures, wherein
the data lines and the scan lines define a plurality of pixels each comprising one of the transistor structures, one of the transparent bottom electrodes, the at least one insulation layer, the color filter layer with one of the plurality of colors, and one of the transparent pixel electrodes, the scan lines respectively are electrically connected to gates of the transistor structures, the data lines respectively are electrically connected to sources of the transistor structures, the scan lines are insulated from the data lines by the at least one insulation layer, and the transparent pixel electrodes respectively are electrically connected to drains of the transistor structures, the transparent bottom electrode of each pixel is electrically connected to the gate of the transistor structure of another pixel.

2. The liquid crystal panel according to claim 1, wherein the data lines partly overlap the transparent bottom electrodes and the transparent pixel electrodes.

3. The liquid crystal panel according to claim 2, wherein a first opening is located between two adjacent transparent pixel electrodes and above a corresponding one of the data lines and extended along the corresponding one of the data lines.

4. The liquid crystal panel according to claim 3, wherein each of the data lines partially overlaps two corresponding adjacent ones of the transparent pixel electrodes.

5. The liquid crystal panel according to claim 3, wherein a second opening is located between two adjacent ones of the transparent bottom electrodes and under the corresponding one of the data lines and extended along the corresponding one of the data lines.

6. The liquid crystal panel according to claim 5, wherein the data line disposed above the second opening partially overlaps the two corresponding adjacent ones of the transparent bottom electrodes.

7. The liquid crystal panel according to claim 1, wherein the color of the color filter layer disposed under one of two adjacent ones of the transparent pixel electrodes differs with the color of the color filter layer disposed under the other one of the two adjacent transparent pixel electrodes, and a boundary between two adjacent color filter layers with different colors is located above a corresponding one of the data lines.

* * * * *